(12) United States Patent
Koide

(10) Patent No.: US 11,339,271 B2
(45) Date of Patent: May 24, 2022

(54) CROSSLINKING AGENT, POLYMER COMPOSITION CONTAINING CROSSLINKING AGENT, AND CROSSLINKED PRODUCT OF SAME

(71) Applicant: YUGENKAISHA FOUR ROAD RESEARCH, Chiba (JP)

(72) Inventor: Kazuo Koide, Chiba (JP)

(73) Assignee: YUGENKAISHA FOUR ROAD RESEARCH, Chiba (JP)

( * ) Notice: Subject to any disclaimer, the term of this patent is extended or adjusted under 35 U.S.C. 154(b) by 257 days.

(21) Appl. No.: 16/618,242

(22) PCT Filed: Oct. 26, 2018

(86) PCT No.: PCT/JP2018/041256
§ 371 (c)(1),
(2) Date: Nov. 29, 2019

(87) PCT Pub. No.: WO2019/088305
PCT Pub. Date: May 9, 2019

(65) Prior Publication Data
US 2021/0155772 A1    May 27, 2021

(30) Foreign Application Priority Data
Oct. 31, 2017   (JP) .............................. JP2017-210924

(51) Int. Cl.
| | |
|---|---|
| C08K 5/00 | (2006.01) |
| B29C 41/14 | (2006.01) |
| C08K 3/22 | (2006.01) |
| C08K 5/098 | (2006.01) |
| C08L 13/02 | (2006.01) |
| B29K 19/00 | (2006.01) |
| B29K 105/00 | (2006.01) |

(52) U.S. Cl.
CPC ............ *C08K 5/0025* (2013.01); *B29C 41/14* (2013.01); *C08K 3/22* (2013.01); *C08K 5/098* (2013.01); *C08L 13/02* (2013.01); *B29K 2019/00* (2013.01); *B29K 2105/0064* (2013.01); *C08K 2003/222* (2013.01); *C08K 2003/2224* (2013.01); *C08K 2003/2227* (2013.01); *C08L 2312/00* (2013.01)

(58) Field of Classification Search
CPC ........ C08K 5/0025; C08K 5/098; C08K 3/22; C08K 2003/2227; C08K 2003/222; C08K 2003/2224; C08L 13/02; C08L 2312/00; B29K 2015/0064; B29C 41/14
USPC .......................................................... 524/399
See application file for complete search history.

(56) References Cited

U.S. PATENT DOCUMENTS

| | | | |
|---|---|---|---|
| 5,989,515 A | * | 11/1999 | Watanabe ................ C01F 7/02 423/625 |
| 8,389,620 B2 | | 3/2013 | Koide |
| 2002/0101007 A1 | | 8/2002 | Koide et al. |
| 2008/0227913 A1 | | 9/2008 | Koide |
| 2015/0233058 A1 | | 8/2015 | Neumann |
| 2017/0099889 A1 | * | 4/2017 | Liou ...................... C08F 236/12 |
| 2017/0218143 A1 | * | 8/2017 | Foo ......................... C08K 5/053 |
| 2018/0016409 A1 | | 1/2018 | Liou |
| 2019/0010271 A1 | | 1/2019 | Kodemura et al. |
| 2019/0177517 A1 | * | 6/2019 | Igari ...................... A41D 19/04 |

FOREIGN PATENT DOCUMENTS

| | | |
|---|---|---|
| JP | 2001-192918 | 7/2001 |
| JP | 2003-165814 | 6/2003 |
| JP | 2005-015514 | 1/2005 |
| JP | 3635060 | 3/2005 |
| JP | 2010-209163 | 9/2010 |
| JP | 4647026 | 3/2011 |
| JP | 2015-509559 | 3/2015 |
| JP | 2015-105281 | 6/2015 |
| JP | 2017-149925 | 8/2017 |
| JP | 2018-009272 | 1/2018 |
| WO | 2008/001764 | 1/2008 |
| WO | 2017/130889 | 8/2017 |

OTHER PUBLICATIONS

International Search Report dated Jan. 29, 2019 International (PCT) Application No. PCT/JP2018/041256.
Starmar et al., "Effect of metal oxides on the properties of carboxyl nitrile rubber vulcanisates", Plastics and Rubber Processing and Applications, vol. 9, 1988, pp. 209-214.
Zakharov, "Vulcanization of Carboxylic Rubbers", Rubber Chemistry and Technology, 1963, vol. 36, No. 2, pp. 568-574.

(Continued)

*Primary Examiner* — Hui H Chin

(74) *Attorney, Agent, or Firm* — Wenderoth, Lind & Ponack, L.L.P.

(57) ABSTRACT

A crosslinking agent which is based on an aluminate complex salt of a hydroxyl group-containing organic compound, which crosslinks a carboxy group and a nitrile group. When the crosslinking agent is added to a carboxy group-denatured NBR latex, gloves having flexibility and a strength comparable to those of natural rubber gloves can be manufactured. Furthermore, the excellent creep resistance is a big characteristic. Moreover, unlike normal sulfur vulcanization gloves, the gloves do not contain sulfur and a vulcanization accelerator, and do not necessarily require addition of zinc oxide.

16 Claims, No Drawings

(56) References Cited

OTHER PUBLICATIONS

Zakharov et al., "Influence of Acids on Scorching and Vulcanization of Carboxylic Rubbers", Rubber Chemistry and Technology, 1963, vol. 36, No. 2, pp. 575-579.
Pallagi et al, "Complexation of Al(III) with gluconate in alkaline to hyperalkaline solutions: formation, stability and structure", Dalton Transactions, 2013, vol. 42, pp. 13470-13476.
"Safety data sheet of Sodium Aluminate", Wako Pure Chemical Industries, 2016, with partial English translation, 7 pages.

* cited by examiner

CROSSLINKING AGENT, POLYMER COMPOSITION CONTAINING CROSSLINKING AGENT, AND CROSSLINKED PRODUCT OF SAME

TECHNICAL FIELD

The present invention relates to a novel aluminate complex salt-based crosslinking agent, a polymer composition containing the crosslinking agent, and a crosslinked molded product of the polymer composition or a crosslinked molded product of a product containing the polymer composition, and more specifically, to a crosslinking agent composed of an aluminate complex salt bonded to a hydroxyl group of a hydroxyl group-containing organic compound, a neutralized product of the complex salt, or a reaction product with a carboxylic acid of the aluminate complex salt, which crosslinks an organic compound containing a carboxy group, a nitrile group, or the like. Examples of the application field of the present invention include a hardening resin composition, a hardening resin molded body, and a hardened material, in particular, a rubber latex composition in which a crosslinking agent is added to a carboxy group-containing latex (NBR or SBR latex) and a crosslinked molded product thereof, a low-allergy dip product and a paper product having excellent creep resistance, water resistance, solvent resistance, and durability. Moreover, the crosslinking agent of the present invention has similar functions to a polycarbodiimide as a crosslinking agent of a carboxy group-containing water-based resin, is useful as a crosslinking agent of a polyurethane dispersion, an acrylic emulsion, a water-based polyester, or a carboxylic acid-denatured water-based resin, and has various uses as a crosslinking agent of a coating material, an ink, a water-based ink, an adhesive, a metal-surface preparation agent, or a coating agent, and a hydrolysis resistance stabilizer of a water-based polyester-based resin or a water-based polyurethane-based resin.

BACKGROUND ART

Dipped products such as rubber gloves and fingerstalls have been widely used in various circles including a medical field (prevention of hospital-acquired infection, SARS infection, and the like), a food processing field (O-157 incidents), and an electronic component manufacturing field in association with an increased interest in safety sanitation. A dip molding method is one method of manufacturing these rubber gloves and fingerstalls. Known examples of the dip molding method include an anode coagulant dipping method in which a mold made from wood, glass, ceramic, metal, or plastic is dipped in advance in a coagulant liquid, and then is dipped in a natural rubber latex composition or a synthetic rubber latex composition, and a Teague coagulant dipping method in which a mold is dipped in a latex composition, and then is dipped in a coagulant liquid, and molded products obtained by these dip molding methods are dip molded articles.

A natural rubber latex is a typical latex for dip molding. A natural rubber latex product has good physical and chemical properties, but a user may suffer from an allergic reaction in association with the elution of a natural protein contained in the product, and thus, the production of products using a protein-free synthetic rubber latex tends to increase.

It has been pointed out that a synthetic rubber latex such as an acrylonitrile-butadiene rubber (NBR rubber), which is a typical example of the synthetic rubber latex, may generate a harmful substance such as hydrogen cyanide originating from acrylonitrile in a combustion exhaust gas, and a new latex raw material such as a styrene-butadiene rubber (SBR) (JP-A-2001-192918: PTL 1), a traditional chloroprene rubber, or a carboxy group-containing ionomer-based elastomer has attracted attention.

High levels of physical properties are required for dip molded articles. In order to exert high levels of physical properties, a crosslinked structure needs to be introduced between polymers.

In the case of a natural rubber, sulfur and a vulcanization accelerator such as zinc oxide are added to form covalent bonds of sulfur between double bonds of molecules of the natural rubber. In the case of the natural rubber, the so-called sulfur vulcanization is considered to form a crosslinked structure even in a natural rubber particle, and excellent physical properties of products are exerted.

The same sulfur vulcanization method as that in the case of the natural rubber is generally adopted also in the case of a diene-based carboxylated synthetic rubber latex. However, the roles of chemicals to be added are considerably different from those in the case of the vulcanization of a natural rubber latex. More specifically, it is considered that, when zinc oxide contacts water, a hydroxyl group is produced on the surface, the hydroxyl group reacts with a carboxy group of a latex particle (P. H. Starmer, Plastics and Rubber Processing and Applications, 9(1988), 209-214: NPL 1) to form a pendant half salt, and furthermore, cluster ion crosslinkage is formed after a heat drying process. The physical properties to be measured, such as a tensile strength, an elongation, and a hardness, are determined by the zinc crosslinkage, and this point is a major difference from the case of the natural rubber latex in which the physical properties of products are determined by sulfur crosslinkage.

As used herein, the term "cluster ion crosslinkage" refers to a state where carboxy groups form a cluster, and a divalent cation of zinc is neutralized by the whole carboxy groups that form the cluster. According to the characteristics of the structure, when the rubber is elongated, the crosslinkage is misaligned, and when stress is applied, stress relaxation (creep) occurs within a short period, and, after a long period of use, permanent distortion becomes larger and the rubber elongates (N. D. Zakharov, (1963) *Vulcanization of Carboxylic Rubbers*. Rubber Chem. and Tech, Rubber Division Acs. Akron, US. Vol 36, no 2, 568-574: NPL 2).

On the other hand, sulfur that crosslinks double bonds originating from butadiene with a covalent bond has a small influence on the physical properties to be measured, such as a tensile strength, an elongation, and a hardness. However, sulfur controls the important properties of rubber products, such as durability, creep resistance, water resistance, and solvent resistance of the rubber products, and this is the reason why the sulfur vulcanization method is frequently adopted also in the carboxylated synthetic rubber latex.

As described above, the sulfur vulcanization plays an important role also in the diene-based carboxylated synthetic rubber latex. On the other hand, since sulfur oxidizes metal when contacting the metal, the use of sulfur tends to be reduced in the electronic component manufacturing field.

In addition, recently, since the development of contact dermatitis based on a delayed allergy to a vulcanization accelerator contained in dip molded articles such as gloves also tends to increase, the development of dip molded articles using no vulcanization accelerator has been demanded.

Furthermore, in the food field, the regulation of the amount of zinc eluted as a heavy metal to be eluted from rubber gloves tends to be strengthened.

JP-A-2003-165814 (PTL 2) proposes a composition for dip molding, which does not substantially contain a sulfur-containing vulcanizing agent, a vulcanization accelerator, and zinc oxide. However, according to the research by the present inventor or the like, a dip product using the composition has problems in which creep resistance, water resistance, and solvent resistance are low and an adherence property is high.

As a crosslinking method with an aluminum-based crosslinking agent using no sulfur and vulcanization accelerator, there are a method using an aluminate by the present inventor or the like (Japanese Patent No. 3635060: PTL 3) and a method using basic aluminum carboxylate by the present inventor (Japanese Patent No. 4647026: PTL 4, U.S. Pat. No. 8,389,620: PTL 5).

Aluminum is amphoteric metal. An aluminate is an anion at a pH of 10-10.5 or more, and Al does not react with a carboxy group of a latex. On the other hand, aluminum functions as a trivalent cation at a pH of 10 or less, and thus can crosslink the carboxy group of the latex. However, the aluminate converts into the trivalent cation immediately after the addition of a latex liquid, and thus needs to be blended with a great deal of caution such that localized crosslinkage does not occur by adding zinc oxide to a diluted latex to block in advance a carboxy group exposed on the surface of a latex particle, and is unsuitable for large-scale industrial manufacturing.

Basic aluminum carboxylate is not cationic unlike normal aluminum carboxylate, and thus can be easily blended into a carboxylated latex, so that a crosslinked product at the same level as that by the sulfur vulcanization can be manufactured without adding sulfur, a vulcanization accelerator, and zinc oxide. Moreover, a NBR dip molded article using such a crosslinking agent is a product that is soft and has excellent creep resistance, similarly to a natural rubber product.

PRIOR ART DOCUMENTS

Patent Documents

[PTL 1] JP-A-2001-192918
[PTL 2] JP-A-2003-165814
[PTL 3] Japanese Patent No. 3635060
[PTL 4] Japanese Patent No. 4647026
[PTL 5] U.S. Pat. No. 8,389,620

Non-Patent Documents

[NPL 1] P. H. Starmer, Plastics and Rubber Processing and Applications vol. 9 (1988), p 209-214
[NPL 2] N. D. Zakharov, (1963) Vulcanization of Carboxylic Rubbers. Rubber Chem. and Tech, Rubber Division Acs. Akron, US. Vol 36, no 2, 568-574

SUMMARY OF INVENTION

Technical Problem

However, there are following disadvantages: an aluminum atom is bonded to a carboxy group, and thus, when a crosslinked body contacts an organic acid, the crosslinkage may be broken due to replacement with the organic acid; a carboxy group is a hydrophilic group, and thus chemical resistance tends to be poor for a hydrophilic substance; and a chlorine-based compound is used as a raw material for synthesis when synthesizing a crosslinking agent, and thus a chlorine ion is contained in the crosslinking agent.

In addition, a further object is to discover a crosslinking agent that can be substituted for sulfur and a sulfur-containing vulcanizing agent.

Solution to Problem

It is an object of the present invention to synthesize an aluminate complex salt by bonding an aluminate to a hydroxyl group under a strong alkaline condition, then synthesize a neutralized product of the aluminate complex salt by neutralizing the aluminate complex salt, and use the neutralized product of the aluminate complex salt as a crosslinking agent. An aluminum atom that is a non-metal atom under a strong alkaline condition converts into a metal atom in a mildly alkaline region at a pH of 10-10.5 or less, a neutral region, and a mildly acidic region, and the neutralized product of the aluminate complex salt acquires crosslinking ability to crosslink a carboxy group.

A neutralization reaction of an aluminate complex salt of a hydroxyl group-containing organic compound is considered to proceed as the following reaction formula.

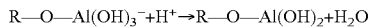

The above neutralized product of the aluminate complex salt can crosslink a carboxy group similarly to the following basic aluminum carboxylate.

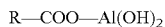

The neutralized product of the aluminate complex salt of the hydroxyl group-containing organic compound fulfills the technical problem because an aluminum atom is not bonded to a carboxy group and a crosslinking agent can be synthesized without containing a chlorine ion.

Moreover, the object to discover a crosslinking agent that can be substituted for sulfur and a sulfur-containing vulcanizing agent is also achieved. Although sulfur is a divalent covalent bond crosslinking agent, the present crosslinking agent is a divalent or more polyvalent covalent bond crosslinking agent, physical properties such as durability, creep resistance, water resistance, and solvent resistance, which surpasses those of a conventional sulfur vulcanization product, are also achieved by using such a crosslinking agent. In addition, a low-allergy crosslinked molded product, in particular, a dip product not containing sulfur, a sulfur-containing vulcanizate, and a vulcanization accelerator is provided. Furthermore, a latex composition not containing zinc oxide can also be provided. By using such a latex composition, a new product is provided also in a paper processing field or the like.

Moreover, when performing synthesis by changing the number of crosslinkable functional groups contained in one molecule of the hydroxyl group-containing organic compound crosslinking agent, a crosslinking agent having various functions can be synthesized.

Attila Pallagi et al. reported that a gluconate ($Gluc^-$) and an aluminate ($Al(OH)_4^-$) form a 1:1 complex salt (anion) under a strong alkaline condition. A position where an aluminum atom is bonded is not a carboxy group but a hydroxyl group.

When the present inventor reacted sorbitol, in which the carbon number is the same as that of gluconic acid and all carbon atoms are bonded to hydroxyl groups, with an aluminate, a complex salt could be formed. In addition, the aluminate was coordinated to all (six) hydroxyl groups.

When calcium nitrate that forms a divalent cation was added to a sorbitol-4Al aluminate complex salt in which an aluminate is coordinated to four hydroxyl groups, calcium aluminate was not generated, but the reaction solution gelated over time. This indicates that the sorbitol-4Al aluminate complex salt was anionic and reacted with a divalent cation ($Ca^{++}$).

As described above, the hydroxyl group-containing organic compound aluminate complex salt is anionic, and the carboxy group is also anionic. Thus, both sides mutually repulse.

When the sorbitol-4Al aluminate complex salt was neutralized by carbon dioxide, and calcium nitrate was further added, the formation of gel did not occur. This indicates that the complex salt converted from anionic into non-ionic by the neutralization and became unresponsive to the $Ca^{2+}$ ion.

This is attributed to the conversion of Al that is an amphoteric metal atom from a non-metal atom under a strong basic condition to a metal atom in between a mildly alkaline region at a pH of 10-10.5 or less and neutral to mildly acidic regions.

When 0.2-0.3 parts in terms of $Al_2O_3$ of the above carbon dioxide-neutralized product of the sorbitol-4Al aluminate complex salt was added to a carboxylated NBR latex stock solution, blending was extremely easily performed.

In the same manner, when 0.2-0.3 parts in terms of $Al_2O_3$ of an erythritol-4Al aluminate complex salt synthesized using powder sodium aluminate with less alkaline content was directly added to a carboxylated NBR latex stock solution, the pH of the blended latex liquid was around 8.8 that is approximate to a point of neutralization of the erythritol-4Al aluminate complex salt. Therefore, a large part of the aluminate complex salt is considered to exist as a neutralized product in the latex blended liquid.

In manufacturing dip molded articles such as NBR gloves described below, the pH of a latex blended liquid is adjusted to be around 9.5. Therefore, about 10-15% of an aluminate complex salt-based crosslinking agent is expected to remain as an aluminate complex salt.

However, since calcium nitrate is used as a coagulant liquid in a dip molded article manufacturing process, one —$OH^-$ is bonded to another —$OH^-$ or —$COO^-$ through $Ca^{2+}$, thereby eliminating anionic properties. Remaining two hydroxyl groups function as a crosslinking agent.

As can be seen from neutralization experiments of an ethylene glycol-2Al aluminate complex salt by malic acid and maleic acid described below, when 1/2-2/3 of an aluminate complex salt is neutralized, the aluminate complex salt fulfills functions as a crosslinking agent as described herein in the section entitled "Syntheses of Neutralized Substances of Hydroxyl Group-Containing Organic Compound Aluminate Complex Salts."

Furthermore, the present inventor added an aluminate to a monohydric alcohol (ethanol or the like), a polyhydric alcohol (ethylene glycol, propylene glycol, glycerol), or a sugar alcohol (erythritol, xylitol, sorbitol, mannitol, lactitol, or the like) and confirmed formation of an aluminate complex salt.

Next, for carbohydrates, an aluminate complex salt crosslinking agent was tried to be synthesized, and the aluminate complex salt crosslinking agent was successfully synthesized in the same manner. For monosaccharides among them, the aluminate complex salt crosslinking agent could be synthesized, but a degeneration reaction known as a Maillard reaction occurred after a lapse of long time from the synthesis, and the reaction solution turned brownish. However, the functions as a crosslinking agent were maintained.

A compound categorized as a hydroxycarboxylic acid contains a hydroxyl group together with a carboxy group. An aluminate is also coordinated to the hydroxyl group to form an aluminate complex salt. The aluminate complex salt contains the carboxy group, and thus is characterized by good water solubility even when the generated aluminate complex salt is neutralized.

Examples of hydroxycarboxylic acids include glycolic acid, lactic acid, hydroxybutyric acid, malic acid, citric acid, tartaric acid, aldonic acid (gluconic acid, hepturonic acid), and uronic acid (glucuronic acid or the like), and examples of aromatic compounds include salicylic acid.

Moreover, an aluminate is also coordinated to a hydroxyl group of a polyether polyol, a polyester polyol, or a polymer polyol used in a urethane resin, a water-based acrylic resin, or the like to form an aluminate complex salt. Examples of the polymer polyol include synthetic polymers such as polyvinyl alcohol, semisynthetic polymers such as carboxymethylcellulose and hydroxyethylcellulose, and natural polymers such as starch, dextrin, cyclodextrin, oligosaccharide, guar gum, alginic acid, pectin, and xanthane gum.

The present crosslinking agent is suitably used as a crosslinking agent of dip products such as NBR synthetic rubber gloves.

A typical crosslinking agent currently used for manufacturing gloves or the like is sulfur (divalent crosslinking agent), and a vulcanization accelerator and zinc oxide are used in combination.

Since the vulcanization accelerator may cause type IV contact dermatitis and zinc oxide is heavy metal, the contents are regulated in a food field or the like.

Moreover, as big disadvantages of physical properties, the products have a small elongation, are hard, and are easy to creep (easy to swell) during use, and thus have no aptitude as surgical gloves, for example.

Normally, about 5% of methacrylic acid is blended into an NBR latex, and the present crosslinking agent crosslinks carboxy groups originating from the methacrylic acid. Therefore, addition of a vulcanization accelerator is unnecessary, and addition of zinc oxide is not necessarily required. Moreover, the present crosslinking agent is a divalent or more polyvalent crosslinking agent and is significantly characterized by creep resistance higher than that of sulfur vulcanization by a divalent crosslinking agent, and a new use can be expected in a medical field or the like.

Incidentally, 1.0-1.5 phr of zinc oxide is added as a vulcanization assistant in the sulfur vulcanization, and the zinc oxide crosslinks 40-65% of the carboxy groups originating from the methacrylic acid of the NBR latex. In the case where zinc oxide is not used in the present method, the remaining amount of unreacted carboxy groups increases, and the adherence property of the products increases. In order to respond to this, handling by an increase in the concentration of coagulant liquid calcium nitrate, an increase in the amount of the crosslinking agent, selection of a NBR latex having a low methacrylic acid content, and the like is required.

Furthermore, the carboxy groups of the latex are blocked by adding a polyhydric alcohol-based polymer such as polyvinyl alcohol, carboxymethylcellulose, starch, dextrin, cyclodextrin, oligosaccharide, or guar gum, and thus the adherence property of end products can be lowered.

Moreover, as a means for proactively blocking the adherence property due to the carboxy groups, a method in which the unreacted carboxy groups of the latex are decreased by blending a magnesium compound such as magnesium oxide, magnesium hydroxide, or colloidal magnesium hydroxide into a latex blended liquid in place of zinc oxide is effective. The colloidal magnesium hydroxide can be easily manufactured by adding a magnesium salt to an alkaline solution (normally, a potassium hydroxide solution in the case of manufacturing gloves).

Although depending on the carboxy group content of the latex, the additive amount of the magnesium compound is in the range of 0.2-1.0 phr in terms of MgO, and preferably, is normally around 0.5 phr.

Moreover, by adding a hydrophobizing agent such as an internal sizing agent or a surface sizing agent, which is heavily used in a paper field, to the latex, or by treating the surface of the products, the adherence property of the end products can be lowered.

Gloves manufactured under such conditions can be easily industrially manufactured using commonly known techniques such as an antitack agent such as calcium stearate, chlorine treatment, and polymer coating.

Moreover, a method of locally blocking only surfaces of carboxy groups on both sides or one side of the gloves with highly basic aluminum chloride, highly basic aluminum nitrate, the crosslinking agent according to the present invention, or the like is effective.

Accordingly, the gloves manufactured by the present crosslinking agent are characterized by having flexibility at the same level as that of a natural rubber, furthermore, are products having excellent creep resistance and durability, and furthermore, surpass natural rubber products because of also having original chemical resistance of NBR.

More specifically, the present invention is as follows.

1. A crosslinking agent including: a neutralized product of an aluminate complex salt of a hydroxyl group-containing organic compound; a divalent metal ion ($Ca^{2+}$, $Mg^{2+}$, or $Zn^{++}$) bound product of the aluminate complex salt of a hydroxyl group-containing organic compound; or a reaction product with a carboxylic acid of the aluminate complex salt of a hydroxyl group-containing organic compound.

2. The crosslinking agent according to 1, in which the hydroxyl group-containing organic compound is a monohydric or polyhydric alcohol.

3. The crosslinking agent according to 1, in which the hydroxyl group-containing organic compound is a polyether polyol, a polyester polyol, a polymer polyol, a hydroxyl group-containing polymer (synthetic polymers such as polyvinyl alcohol, semisynthetic polymers such as carboxymethylcellulose and hydroxyethylcellulose, and natural polymers such as starch, dextrin, cyclodextrin, oligosaccharide, guar gum, alginic acid, pectin, and xanthane gum).

4. The crosslinking agent according to 1, in which the hydroxyl group-containing organic compound is a carbohydrate.

5. The crosslinking agent according to 1, in which the hydroxyl group-containing organic compound is a hydroxycarboxylic acid or a salt thereof.

6. A polymer composition, in which the crosslinking agent according to 1, 2, 3, 4, and/or 5 is blended.

7. A polymer composition, in which the aluminate complex salt according to any one of 1 to 5 is directly blended into the polymer composition to be neutralized.

8. The polymer composition according to 6 or 7, in which the polymer contains a carboxy group and/or a nitrile group.

9. The polymer composition according to 6, 7 or 8, in which the polymer according to 6, 7, or 8 is a carboxy-denatured NBR latex or SBR latex, a carboxy group-containing chloroprene latex, a carboxy group-containing polyurethane dispersion, a carboxy group-containing acrylic emulsion, a carboxy group-containing water-based polyester, or a carboxylic acid-denatured water-based resin.

10. The polymer composition according to 6, 7, 8, or 9, further containing one or two or more organic compounds selected from an internal sizing agent; a surface sizing agent; and polyhydric alcohols such as polyvinyl alcohol, polyethylene oxide, carboxymethylcellulose, starch, dextrin, cyclodextrin, oligosaccharide, guar gum, alginic acid, pectin, and xanthane gum.

11. The polymer composition according to 6, 7, 8, 9, or 10, in which magnesium oxide, magnesium hydroxide, or colloidal magnesium hydroxide is further added thereto.

12. A crosslinked molded product obtained by molding and crosslinking the polymer composition according to 6, 7, 8, 9, 10, or 11.

13. The crosslinked molded product according to 12, in which the molded product is surface-treated with highly basic aluminum chloride, highly basic aluminum nitrate, an internal sizing agent, a surface sizing agent, or the crosslinking agent according to 1.

14. The crosslinked molded product according to 11, 12, or 13 12 or 13, in which the crosslinked molded product is a dip molded article or a paper product.

Advantageous Effects of Invention

A crosslinking agent in which an aluminum atom is directly bonded to an oxygen atom of an organic compound hydroxyl group can be synthesized by an aluminate complex salt. There are quite a lot of organic compounds having a hydroxyl group, and various crosslinking agents can be synthesized. Therefore, a crosslinking agent that gives a detailed response to a quality demand of a product using the crosslinking agent can be synthesized.

Moreover, synthesis of a crosslinking agent is extremely easy, and synthesis of a crosslinking agent without containing a chlorine ion is also easy.

DESCRIPTION OF EMBODIMENTS

Many reaction systems in which the present crosslinking agent is used are water-based. Moreover, many aluminate complex salts of a hydroxyl group-containing organic compound are water-soluble. Therefore, desirably, neutralized products of aluminate complex salts of a hydroxyl group-containing organic compound are also water-soluble. However, neutralized products of monohydric alcohol or dihydric alcohol aluminate complex salts become water-insoluble in many cases due to lack of water-soluble functional groups, but reactants neutralized by some organic acids maintain water solubility. In this regard, however, in carbon dioxide-neutralized products of polyhydric alcohol or hydroxycarboxylic acid-based aluminate complex salts, the neutralized products may maintain water solubility even when hydroxyl groups are completely formed into aluminate complex salts.

Moreover, various qualities are required for a crosslinked molded product. Therefore, the diversity of qualities of the crosslinking agent is also important as well as the diversity of raw materials to be crosslinked (organic compounds containing a hydroxyl group). Thus, desirably, a polyhydric alcohol, a carbohydrate, or a hydroxycarboxylic acid, having multiple hydroxyl groups is selected as a crosslinking agent raw material, and the coordination number of an aluminate is selected depending on the intended use.

More specifically, 1-5 or 6 equivalents of the aluminate are added to, for example, sorbitol, fructose, or a gluconate, to synthesize an aluminate complex salt, the aluminate complex salt is directly blended into, or partially or completely neutralized by an acid, and then blended into a raw material to be crosslinked, the quality of a crosslinked molded product is measured, and a crosslinking agent adapted for the purpose is selected.

In the case of a normal carboxylated latex, regarding the additive amount of the crosslinking agent, 0.2-0.3 parts in terms of $Al_2O_3$ are appropriate in many cases, but the crosslinking agent can be used within the range of 0.1-3.0 parts depending on the use.

In the case of manufacturing dip molded articles, the pH of a latex prepared liquid is around 9.5-10.0. An alkali may be added to the above blended latex, or the aluminate complex salt may be directly added to the latex stock solution to be a neutralized product, and then the pH may be adjusted by adding an alkali.

EXAMPLES (Synthesis of Crosslinking Agent)
1. Synthesis Reaction and Properties of Crosslinking Agent The Na/Al ratio of sodium aluminate to be used is not particularly limited, and the sodium aluminate used herein is sodium aluminate NA-170 manufactured by ASAHI Chemical Co., Ltd.

Analysis Values
$Al_2O_3$ 18.73%
$Na_2O$ 19.37%
Molar Ratio 1.70

The above sodium aluminate is diluted and adjusted to be 2.0 mol/L (in terms of $NaAlO_2$) as $NaAlO_2$.

In contrast, a hydroxyl group-containing organic compound is adjusted to be a 2.0 mol/L solution (in terms of hydroxyl groups) and diluted depending on the number of aluminate complex salts to be introduced. Specifically, when introducing n of aluminate complex salts (n-valent aluminate complex salt), the hydroxyl group-containing organic compound is diluted by n times.

An equivalent 2.0 molar sodium aluminate solution is added while being stirred to the above diluted hydroxyl group-containing organic compound solution at normal temperature, and the mixture is left for two hours, so that a hydroxyl group-containing organic compound aluminate complex salt is synthesized.

First, syntheses of a sorbitol-4Al aluminate complex salt, a gluconic acid-4Al aluminate complex salt, and neutralized products thereof and properties thereof will be described.

When adding a calcium nitrate tetrahydrate 10% solution to a 2.0 molar sodium aluminate solution in terms of $NaAlO_2$, calcium aluminate is precipitated. Whether sodium aluminate remains can be determined.

(1) Syntheses of Sorbitol (Hexahydric Alcohol)-4Al Aluminate Complex Salt and Gluconic Acid (Pentahydric Alcohol)-4Al Aluminate Complex Salt To each of 100 ml of a 0.5 molar sorbitol aqueous solution and 100 ml of a 0.5 molar sodium gluconate aqueous solution, 100 ml of a 2 molar sodium aluminate (in terms of $NaAlO_2$) was added while being stirred, and the mixture was reacted for two hours, so that a sorbitol-4Al aluminate complex salt and a gluconic acid-4Al aluminate complex salt were synthesized. They both were water-soluble.

(2) Addition Test (1) of Calcium Nitrate Solution

To each of the above reaction solutions, 10 ml of a 10% calcium nitrate tetrahydrate solution was added. Calcium aluminate was not precipitated. This indicates that sodium aluminate did not remain.

However, after a lapse of one hour, the whole reaction solution of the sorbitol-4Al aluminate complex salt to which calcium nitrate was added gelated.

In contrast, the gluconic acid-4Al aluminate complex salt maintained water solubility.

It is considered that the sorbitol-4Al aluminate complex salt (anionic) gelated because the complex salt is bonded due to substitution of $Na^+$ with $Ca^{2+}$, but the gluconic acid-4Al aluminate complex salt maintained water solubility because of containing a carboxy group.

(3) Neutralization of Sorbitol (Hexahydric Alcohol)-4Al Aluminate Complex Salt and Gluconic Acid (Pentahydric Alcohol)-4Al Aluminate Complex Salt Carbon dioxide was added to each of the above aluminate complex salt solutions to adjust the pH to 8.3-8.5, so that carbon dioxide-neutralized products of the sorbitol (hexahydric alcohol)-4Al aluminate complex salt and the gluconic acid (pentahydric alcohol)-4Al aluminate complex salt were synthesized.

(4) Addition Test (2) of Calcium Nitrate Solution

In the same manner as (3), the addition test of the calcium nitrate solution was performed. However, in the neutralized solution of the sorbitol-4Al aluminate complex salt, precipitation and gelation of calcium aluminate did not occur. The sorbitol (hexahydric alcohol)-4Al aluminate complex salt became a neutralized product, thereby being non-ionic, bonding by $Ca^{2+}$ was not generated, and gelation did not occur.

In contrast, in the neutralized product of the gluconic acid-4Al aluminate complex salt, a precipitate was temporarily generated during the addition of the calcium nitrate solution but disappeared rapidly. It is considered that the precipitation temporarily occurred because $Ca^{2+}$ reacted with a carboxy group of the neutralized product of the gluconic acid-4Al aluminate complex salt.

2. Syntheses of Various Hydroxyl Group-Containing Organic Compound Aluminate Complex Salts 1) Synthesis of Ethanol (Monohydric Alcohol)-1Al Aluminate Complex Salt To 100 ml of a 2 molar ethanol aqueous solution, 100 ml of a 2 molar sodium aluminate (in terms of $NaAlO_2$) was added while being stirred, and the mixture was reacted for two hours, so that an ethanol-1Al aluminate complex salt was synthesized.

Even when a calcium nitrate solution was added to the synthesized solution, a precipitate of calcium aluminate was not generated. This indicates that sodium aluminate did not remain.

The reaction solution gradually (after about six hours) became cloudy when being stored in the air for a long time, and the wall of a container was covered with a precipitate after a few days. It is considered that the ethanol-1Al aluminate complex salt was insolubilized by absorbing carbon dioxide in the air.

2) Syntheses of Ethylene Glycol (Dihydric Alcohol)-1Al Aluminate Complex Salt and Ethylene Glycol-2Al Aluminate Complex Salt To each of 100 ml of a 2 molar ethylene glycol erythritol aqueous solution and 100 ml of a 1 molar ethylene glycol aqueous solution, 100 ml of a 2 molar sodium aluminate (in terms of $NaAlO_2$) was added while being stirred, and the mixture was reacted for two hours, so that an ethylene glycol-1Al aluminate complex salt and an ethylene glycol-2Al aluminate complex salt were synthesized. Even when a calcium nitrate solution was added to each of the synthesized solutions, a precipitate of calcium aluminate was not generated.

Moreover, when each of the reaction solutions was stored in the air for a few days, crystals were generated.

3) Syntheses of Erythritol (Tetrahydric Alcohol)-2Al Aluminate Complex Salt and Erythritol-4Al Aluminate Complex Salt To each of 100 ml of a 1 molar ethylene glycol aqueous solution and 100 ml of a 0.5 molar ethylene glycol aqueous solution, 100 ml of a 2 molar sodium aluminate (in terms of $NaAlO_2$) was added while being stirred, and the mixture was reacted for two hours, so that an erythritol-2Al aluminate complex salt and an erythritol-4Al aluminate complex salt were synthesized. Even when a calcium nitrate solution was added to each of the synthesized solutions, a precipitate of calcium aluminate was not generated.

4) Syntheses of Sorbitol (Hexahydric Alcohol)-2Al, 4Al, and 6Al Aluminate Complex Salts To each of 100 ml of a 1 molar sorbitol aqueous solution, 100 ml of a 0.5 molar sorbitol aqueous solution, and 100 ml of a 1/3 molar sorbitol aqueous solution, 100 ml of a 2 molar sodium aluminate (in terms of $NaAlO_2$) was added while being stirred, and the mixture was reacted for two hours, so that a sorbitol-2Al aluminate complex salt, a sorbitol-4Al aluminate complex salt, and a sorbitol-6Al aluminate complex salt were synthesized. Even when a calcium nitrate solution was added to each of the synthesized solutions, a precipitate of calcium aluminate was not generated.

5) Syntheses of Carbohydrate Fructose (Pentahydric Alcohol)-2Al Aluminate Complex Salt and Fructose-3Al Aluminate Complex Salt To each of 100 ml of a 1 molar fructose aqueous solution and 100 ml of a 2/3 molar fructose aqueous solution, 100 ml of a 2 molar sodium aluminate (in terms of $NaAlO_2$) was added while being stirred, and the mixture was reacted for two hours, so that a fructose-2Al aluminate complex salt and a fructose-3Al aluminate complex salt were synthesized. Even when a calcium nitrate solution was added to each of the synthesized solutions, a precipitate of calcium aluminate was not generated.

However, degeneration occurred by a Maillard reaction after a lapse of time from the synthesis, and the reaction solution was colored, but the functions as a crosslinking agent were maintained.

6) Syntheses of Hydroxycarboxylic Acid Aluminate Complex Salts (1) Syntheses of Gluconic Acid (Pentahydric Alcohol Carboxylic Acid)-2Al, -4Al, and -5Al Aluminate Complex Salts To each of 100 ml of a 1 molar sodium gluconate aqueous solution, 100 ml of a 0.5 molar sodium gluconate aqueous solution, and 100 ml of a 0.4 molar sodium gluconate aqueous solution, 100 ml of a 2 molar sodium aluminate (in terms of $NaAlO_2$) was added while being stirred, and the mixture was reacted for two hours, so that a gluconic acid-2Al aluminate complex salt, a gluconic acid-4Al aluminate complex salt, and a gluconic acid-5Al aluminate complex salt were synthesized. Even when a calcium nitrate solution was added to each of the synthesized solutions, a precipitate of calcium aluminate was not generated.

(2) Synthesis of Tartaric Acid (Dihydric Alcohol Dicarboxylic Acid)-2Al Aluminate Complex Salt To 100 ml of a 1 molar sodium gluconate tartaric acid aqueous solution, 100 ml of a 2 molar sodium aluminate (in terms of $NaAlO_2$) was added while being stirred, and the mixture was reacted for two hours, so that a tartaric acid-2Al aluminate complex salt was synthesized. Even when a calcium nitrate solution was added to the synthesized solution, a precipitate of calcium aluminate was not generated.

6) Syntheses 7) Syntheses of Polymer Polyol Aluminate Complex Salts (1) Synthesis of Carboxymethylcellulose Aluminate Complex Salt To 150 g of a CMC Daicel 1110 (Daicel FineChem Ltd., the degree of etherification 0.72, 2% viscosity 113 mPa.$) 2% aqueous solution, 3.4 g of the above sodium aluminate ($Al_2O_3$ 18.73%) was added, and the mixture was reacted for two hours, so that an aluminate complex salt including nearly one aluminate complex salt per one cellulose residue was synthesized. The reaction solution was water-soluble but became slightly turbid. Even when a calcium nitrate solution was added to the synthesized solution, a precipitate of calcium aluminate was not generated. However, the reaction solution to which calcium nitrate was added gelated in a short time.

(2) Synthesis of Polyvinyl Alcohol Aluminate Complex Salt

For synthesis of the above aluminate complex salt, powder sodium aluminate with less Na content was used in consideration of a deacetylation reaction of polyvinyl alcohol under a strong alkaline condition. The powder sodium aluminate is sodium aluminate NA-120 manufactured by ASAHI Chemical Co., Ltd.

Analysis Values $Al_2O_3$ 53.6%

$Na_2O$ 39.7%

Molar Ratio 1.22

(2-1) Synthesis of Carboxy-Denatured Polyvinyl Alcohol Aluminate Complex Salt

To a carboxy-denatured PVA (J POVAL AF-17; manufactured by JAPAN VAM & POVAL CO., LTD.) 10% solution, 3.8 g of powder sodium aluminate (10% solution) in terms of $Al_2O_3$ was added, so that a carboxy-denatured polyvinyl alcohol aluminate complex salt was synthesized. The reaction solution was water-soluble. Even when a calcium nitrate solution was added to the synthesized solution, a precipitate of calcium aluminate was not generated. However, the reaction solution to which calcium nitrate was added gelated in a short time.

(2-2) Synthesis of Easily Water-Soluble Polyvinyl Alcohol Aluminate Complex Salt To 100 g of an easily water-soluble PVA (EF-05; manufactured by JAPAN VAM & POVAL CO., LTD.) 10% solution, which was dissolved at normal temperature, 3.8 g of powder sodium aluminate (10% solution) in terms of $Al_2O_3$ was added, so that a polyvinyl alcohol aluminate complex salt was synthesized. The reaction solution was water-soluble. Even when a calcium nitrate solution was added to the synthesized solution, a precipitate of calcium aluminate was not generated. However, the reaction solution to which calcium nitrate was added gelated in a short time.

3. Syntheses of Neutralized Substances of Hydroxyl Group-Containing Organic Compound Aluminate Complex Salts 1) Neutralization of Hydroxyl Group-Containing Organic Compound Aluminate Complex Salts by Carbon Dioxide By adding an acid (inorganic acid) or an acid salt to the above n-valent aluminate complex salt (hydroxyl group-containing organic compound $(-O-Al(OH)_3^-Na^+)_n$) and adjusting the pH to 7-9, so that a neutralized product of an aluminate complex salt (assumed as hydroxyl group-containing organic compound $(-O-Al(OH)_2)_n$) can be synthesized. Here, the neutralization was performed by adding carbon dioxide. The pH was set to be around 8.5 as in a sodium hydrogen carbonate solution.

In place of carbon dioxide, an inorganic acid such as hydrochloric acid, nitric acid, sulfuric acid, or boric acid may be used. Moreover, an organic acid other than a carboxylic acid may be used. Moreover, an acid salt such as potassium dihydrogen phosphate may be used.

(1) Neutralization of Monohydric Alcohol Aluminate Complex Salt (Ethyl Alcohol-1Al Aluminate Complex Salt) or Dihydric Alcohol Aluminate Complex Salt (Ethylene Glycol-2Al Aluminate Complex Salt)

An ethyl alcohol-1Al aluminate complex salt or a dihydric alcohol aluminate complex salt (ethylene glycol-aluminate complex salt) was stored in the air for a long period, a precipitate was generated. Moreover, when the neutralization was performed by carbon dioxide, a precipitate was generated in the same manner.

(2) Neutralization of More Than Trihydric Alcohol (Erythritol) Aluminate Complex Salt In neutralization of a more than trihydric alcohol (erythritol or the like) aluminate complex salt by carbon dioxide, a product maintained water solubility.

Moreover, even when calcium nitrate tetrahydrate was added to the neutralized solution, a precipitate was not generated.

(3) Neutralization of Hydroxycarboxylic Acid Aluminate Complex Salts

All neutralized products of hydroxycarboxylic acid aluminate complex salts were water-soluble.

Moreover, even when calcium nitrate was added to the neutralized solution, a precipitate was not generated.

(4) Neutralization of Carboxymethylcellulose Aluminate Complex Salt A neutralized product of a carboxymethylcellulose aluminate complex salt by carbon dioxide was water-soluble, but slightly took on a milky white color.

Moreover, even when calcium nitrate was added to the neutralized solution, a precipitate was not generated.

2) Neutralization of Hydroxyl Group-Containing Organic Compound Aluminate Complex Salt by Organic Carboxylic Acid Although a hydroxyl group-containing organic compound aluminate complex salt can be neutralized by an organic carboxylic acid, a neutralized product of the hydroxyl group-containing organic compound aluminate complex salt reacts with a carboxylic acid. Therefore, a part of the crosslinking agent is consumed by the reaction with the carboxylic acid, and thus the neutralization by the organic carboxylic acid is basically undesirable. However, the neutralization by the organic carboxylic acid can be used to contribute to the adjustment of crosslinking strength due to a decrease in the crosslinking point number of the crosslinking agent, the improvement in hydrophilicity, provision of water solubility, and the like. Neutralization of an ethylene glycol-2Al aluminate complex salt by a carboxylic acid will be described below as an example.

(1) Reaction of Ethylene Glycol-2Al Aluminate Complex Salt with Carboxylic Acid

Properties of neutralized products are different from one another depending on the types and properties of carboxylic acids.

Thus, for the ethylene glycol-2Al aluminate complex salt whose reaction with a carboxylic acid is easy to be observed, a reaction with a carboxylic acid was examined.

(i) Reaction with Maleic Acid (Dicarboxylic Acid)

Even when the amount of maleic acid, at which excess $Na^+$ is neutralized, was added such that the equivalent of ethylene glycol ($-O-Al(OH)_3^- Na^+)_2$ was obtained, the water solubility was maintained. It is considered that, the excess $Na^+$ (equivalent to 0.7) of sodium aluminate having $Na/Al=1.7$ is simply neutralized by maleic acid in this range, and the ethylene glycol-2Al aluminate complex salt was not reacted with maleic acid.

However, by adding maleic acid that neutralizes $Na^+$ that is the half of the amount of $Na^+$ equivalent to ethylene glycol ($-O-Al(OH)_3^- N^+)_2$, a precipitate was generated.

(ii) Reaction with Malic Acid (Hydroxy Dicarboxylic Acid)

In the same manner as the above, even when malic acid was added such that the equivalent of ethylene glycol ($-O-Al(OH)_3^- Na^+)_2$ was obtained, the water solubility was maintained.

However, by adding malic acid that neutralizes $Na^+$ that is ⅔ of the amount of $Na^+$ equivalent to ethylene glycol ($-O-Al(OH)_3^- Na^+)_2$, the whole liquid gelated. Clearly, malic acid was crosslinked. Moreover, this fact indicates that, even if all $Na^+$ are not neutralized by an acid, a carboxy group is crosslinked by neutralization of about ⅔ of the neutralization equivalent.

(iii) Reaction with Citric Acid (Hydroxy Tricarboxylic Acid)

Even when citric acid that neutralizes all $Na^+$ of the ethylene glycol-2Al aluminate complex salt was added, a citric acid-neutralized product of the ethylene glycol-2Al aluminate complex salt maintained water solubility.

Assuming from the reaction with malic acid, it is considered that citric acid was also crosslinked, and the water solubility was maintained because of one more carboxy group having high hydrophilicity.

Therefore, by the neutralization with citric acid, the neutralized product of the ethylene glycol-2Al aluminate complex salt can be maintained to be water-soluble.

The citric acid-neutralized product was gradually thickened after a lapse of two weeks. This indicates that citric acid was also crosslinked.

4. Manufacture of Crosslinking Agent-Containing NBR Latex Compositions (Compound Latexes)

Each of 0.2 parts (as $Al_2O_3$) of the above $CO_2$-neutralized product of the erythritol-2Al aluminate complex salt (1) and 0.2 parts (as $Al_2O_3$) of the above $CO_2$-neutralized product of the erythritol-4Al aluminate complex salt (2) was added while being stirred to an NBR latex stock solution.

Powder sodium aluminate was used as sodium aluminate. The composition of the powder sodium aluminate is as follows.

$NaAlO_2$
$Al_2O_3$ content 54.1%
$Na/Al=1.25$ (Results)

(1) Blending Stability Test

The above crosslinking agent-blended latex was filtered by a 200-mesh metal sieve, and a crosslinking agent-blended stability test was performed. An aggregate was not observed (refer to Table 1).

The used NBR latex is KLN 830 manufactured by Kumho.

Latex
Concentration 44.8%
pH 8.4

(2) Pot Life Test of Blended Latex

The above crosslinking agent-blended latex was stored at normal temperature, and a pot life was tested. Generation of an aggregate was not observed even after storing for 60 days or more (refer to Table 1).

(Evaluation)

According to the above results, a high-concentration latex in which additives such as sulfur, zinc oxide, a vulcanization accelerator, an antioxidant, and a chlorine ion are not contained at all and only a water-soluble crosslinking agent is blended can be stably blended. Therefore, market supply as an NBR latex compound became possible.

5. Hydroxyl Group-Containing Organic Compound Aluminate Complex Salts and/or Neutralized Substance Crosslinking Agent-Blended NBR Latexes Thereof The used NBR latex is the above KLN 830 manufactured by Kumho.

Comparative Example 1

Composition Liquid for Sulfur Vulcanization Dipped Products
Additive Agent
KOH 1.6 parts
ZnO 1.25 parts
S 1.0 part
BZ 0.2 parts
(Dibutyldithiocarbamic Acid Zinc)
By adding the above chemical to water, the latex concentration was adjusted to 30%.

Reference Example

The physical properties were measured using commercial natural rubber gloves.

Example 1

By adding water to a compound latex liquid to which 0.25 parts in terms of $Al_2O_3$ of the carbon dioxide-neutralized product of the erythritol-2Al aluminate complex salt was added, the latex concentration was adjusted to 30%, and by adding a 10% KOH solution, the pH was adjusted to 9.6.

Example 2

After 0.25 parts (in terms of $Al_2O_3$) of the erythritol-4Al aluminate complex salt synthesized using powder sodium aluminate was directly added to a latex liquid, the latex concentration was adjusted to 30%.
Then, by adding a 10% KOH solution, the pH was adjusted to 9.7.

Example 3

Colloidal magnesium hydroxide was prepared as follows.
To a liquid composed of 16.2 g of a 10% potassium hydroxide solution and 24.7 g of water, 34.1 g of a $MgCl_2 \cdot 6H_2O$ 5% aqueous solution (0.5 phr in terms of MgO) was added while being stirred. Next, the generated colloidal magnesium hydroxide solution was added to a compound latex liquid to which 0.25 parts in terms of $Al_2O_3$ of the carbon dioxide-neutralized product of the erythritol-2Al aluminate complex salt was added, so that a 30% latex liquid was obtained.

Example 4

To a compound latex liquid to which 0.25 phr in terms of $Al_2O_3$ of the carbon dioxide-neutralized product of the erythritol-2Al aluminate complex salt was added, 0.5 phr of dispersed magnesium oxide (Kyowamag 150; manufactured by Kyowa Chemical Industry Co., Ltd.) was added, then, by adding water and a 10% KOH solution, the pH was adjusted to 9.6 and the concentration was adjusted to 30%, and the latex liquid was left for one day.

Next, NBRs used in Example 5 and Example 6 described below are 6338 manufactured by Synthomer.

Example 5

A compound latex was prepared by adding 0.3 parts in terms of $Al_2O_3$ of the carbon dioxide-neutralized product of the sorbitol-4Al aluminate complex salt (water-soluble) and further adding 1.4 parts of 5% polyvinyl alcohol (PVA-117; manufactured by KURARAY CO., LTD.). By adding water and a 10% KOH solution to the compound liquid, the pH was adjusted to 9.5 and the latex concentration was adjusted to 30%.

The above compound liquid was offered to a pot life test separately.

Example 6

A PVA-110 (manufactured by KURARAY CO., LTD.) 7% solution was prepared, and a powder sodium aluminate 15% solution (in terms of $Al_2O_3$) was added such that one Al is bonded per six vinyl alcohol residues, so that a PVA-110 aluminate complex salt solution (abbreviated as PVA-110×6Al) was synthesized.

A compound latex was prepared by directly adding 0.3 parts (in terms of $Al_2O_3$) of the above PVA-110×6Al solution to a NBR latex and further adding 1.0 part of a sizing agent (BANDIS T-25K; disproportionation rosin, manufactured by Harima Chemicals Group, Inc.). Then, by adding water and a 10% KOH solution, the pH was adjusted to 9.7 and the latex concentration was adjusted to 30%.

6. Manufacture of Dip Molded Articles (Fingerstalls)
Manufacture of Dip Molded Articles (Fingerstalls)
Mold
sandblasted test tube by sandblasting (diameter 17 mm)
Coagulant Liquid
calcium nitrate tetrahydrate
300 g/L (Example 1 and Example 2)
200 g/L (Comparative Example 1, Examples 3, 4, 5, and 6)
Dipping of Mold into Coagulant Liquid
dipping time 10 seconds
Film Deposition
dipping of mold into latex prepared liquid described above, time 10 seconds
deposition preliminary drying 75° C., 3 minutes
washing (reaching) 50° C., 3 minutes
deposition drying/heating 95° C., 3 minutes, 120° C., 15 minutes The fingerstalls were removed from the mold and used as samples of the following evaluation test.

The pot lives of the above latex compounds and evaluation results of the dip molded articles are shown in Table 1.
1) Coagulant Agent Concentration
(Result)

By using the latex to which colloidal magnesium hydroxide is added (Example 3) and the latex to which magnesium oxide is added (Example 4), fingerstalls having thicknesses substantially the same as in the sulfur vulcanization latex to which zinc oxide is added (Comparative Example 1) can be manufactured at the same coagulant agent concentration. Moreover, by also using the latex to which PVA is added (Example 5) and the latex to which a PVA crosslinking agent is added (Example 6), fingerstalls can be manufactured at the same coagulant agent concentration as in the latex to which zinc oxide is added.

2) Physical Property Test
(Result)

Erythritol-2Al aluminate complex salt neutralized product NBR fingerstalls, erythritol-4Al aluminate complex salt directly-added NBR fingerstalls, sulfur vulcanization NBR fingerstalls, and commercial natural rubber gloves all showed tensile stresses of around 30 MPa. However, while the fracture elongation was about 600% in the sulfur vulcanization NBR, the fracture elongations in the aluminate complex salt-based fingerstalls reached 750-800%, which was the same as the fracture elongation of the natural rubber gloves, and extremely soft dipped rubber products could be obtained.

Although Examples 5 and 6 are different in the latex manufacturer, substantially the same fingerstalls could be obtained.

3) Durability and Water Resistance Test

After wearing the above fingerstalls on fingers successively for 14 days, a wearing aptitude test of durability, creep resistance, and water resistance was performed. The durability was classified into excellent, good, and normal by successively wearing on fingers and comprehensively judging the degree of swelling and the degree of whitening of the fingerstalls after wearing. The creep resistance was determined by the degree of an elongation (swelling) of the fingerstalls after wearing. The creep resistance was classified into excellent, good, and normal in ascending order of the degree of swelling. The water resistance was determined by the degree of whitening of a rubber film in wearing. Severe whitening was indicated as poor. The water resistance was classified into excellent, good, and normal corresponding to the degree of whitening.

(Result)

The durability, creep resistance, and water resistance of the erythritol-2Al aluminate complex salt neutralized product-added NBR latex fingerstalls (Example 1), the erythritol-4Al aluminate complex salt directly-added fingerstalls (Example 2), the colloidal magnesium hydroxide-added fingerstalls (Example 3), and the magnesium oxide-added fingerstalls (Example 4) have quality equal to or more than that of the sulfur vulcanization fingerstalls (Comparative Example 1).

In Example 5 and Example 6, despite a different latex raw material, fingerstalls having the same quality as that of Examples described above could be manufactured.

Non-Adherence Property Test

Four manufactured fingerstalls were stacked alternately and sandwiched by a bulky book (Kojien). The fingerstalls were taken out three days later, and the non-adherence property was indicated as excellent when the fingerstalls were easily peeled.

(Result)

The fingerstalls manufactured from the latex obtained by blending PVA into the aluminate complex salt-based crosslinking agent and the latex obtained by blending the sizing agent into the PVA aluminate complex salt-based crosslinking agent were excellent in the non-adherence property.

TABLE 1

| | NBR Fingerstalls or Natural Rubber Latex Gloves | | | | | | | |
|---|---|---|---|---|---|---|---|---|
| | Latex Compound | | Tensile | | | | | Non- |
| | Blending Stability | Pot Life | Thickness (mm) | Strength (MPa) | Elongation (%) | Durability | Creep Resistance | Water Resistance | Adherence Property |
| Reference Example Latex Gloves | | | 0.08 mm | 31.2 MPa | 630% | normal | normal | normal | |
| Comparative Example 1 | no aggregation | ≥60 days | 0.1 mm | 30.2 MPa | 600% | normal | normal | normal | |
| Example 1 | no aggregation | ≥60 days | 0.094 mm | 30.5 MPa | 810% | excellent | good | good | |
| Example 2 | no aggregation | ≥60 days | 0.095 mm | 31.8 MPa | 790% | excellent | excellent | excellent | |
| Example 3 | no aggregation | ≥60 days | 0.098 mm | 29.8 MPa | 780% | excellent | excellent | excellent | |
| Example 4 | no aggregation | ≥60 days | 0.098 mm | 30.0 MPa | 770% | excellent | excellent | excellent | |
| Example 5 | no aggregation | ≥60 days | 0.096 mm | 26.9 MPa | 710% | excellent | excellent | excellent | excellent |
| Example 6 | no aggregation | ≥60 days | 0.095 mm | 27.5 MPa | 700% | excellent | excellent | excellent | excellent |

(Evaluation)

An NBR latex compound in which a neutralized product of an aluminate complex salt is blended and a latex compound into which an aluminate complex salt is directly blended to be neutralized can be easily prepared and have excellent pot lives.

Moreover, fingerstalls manufactured from the above NBR latex compound have a strength (tensile strength) comparable to that of NBR sulfur vulcanization dipped products (latex gloves).

Furthermore, a big characteristic of the present products is being soft products having an elongation at the same level as that of natural rubber latex products. Moreover, another big characteristic is durability, creep resistance, and water resistance surpassing those of sulfur vulcanization products.

Therefore, the present products have properties capable of being comparable to natural rubber products even in a medical field.

The invention claimed is:

1. A crosslinking agent comprising:
   a neutralized product of an aluminate complex salt of a hydroxyl group-containing organic compound;
   a divalent metal ion $Ca^{2+}$, $Mg^{2+}$, or $Zn^{++}$ bound product of the aluminate complex salt of a hydroxyl group-containing organic compound; or
   a reaction product with a carboxylic acid of the aluminate complex salt of a hydroxyl group-containing organic compound.

2. The crosslinking agent according to claim 1, wherein the hydroxyl group-containing organic compound is a monohydric or polyhydric alcohol; a polyether polyol; a polyester polyol; a hydroxyl group-containing polymer selected from polyvinyl alcohol, carboxymethylcellulose, hydroxyethylcellulose, starch, dextrin, cyclodextrin, oligosaccharide, guar gum, alginic acid, pectin, and xanthane gum; a carbohydrate; or a hydroxycarboxylic acid.

3. A polymer composition, comprising a polymer and a crosslinking agent comprising:
   a neutralized product of an aluminate complex salt of a hydroxyl group-containing organic compound;
   a divalent metal ion $Ca^{2+}$, $Mg^{2+}$, or $Zn^{++}$ bound product of the aluminate complex salt of a hydroxyl group-containing organic compound; or
   a reaction product with a carboxylic acid of the aluminate complex salt of a hydroxyl group-containing organic compound.

4. The polymer composition according to claim 3, wherein the neutralized product of an aluminate complex salt of a hydroxyl group-containing organic compound is neutralized by directly blending the aluminate complex salt into the polymer composition.

5. The polymer composition according to claim 3, wherein the polymer contains a carboxy group and/or a nitrile group.

6. The polymer composition according to claim 3, wherein the polymer is a carboxy-denatured NBR latex or SBR latex, a carboxy group-containing chloroprene latex, a carboxy group-containing polyurethane dispersion, a carboxy group-containing acrylic emulsion, a carboxy group-containing water-based polyester, or a carboxylic acid-denatured water-based resin.

7. The polymer composition according to claim 3, further comprising one or two or more organic compounds selected from an internal sizing agent, a surface sizing agent, polyvinyl alcohol, polyethylene oxide, carboxymethylcellulose, starch, dextrin, cyclodextrin, oligosaccharide, guar gum, alginic acid, pectin, and xanthane gum.

8. The polymer composition according to claim 3, further comprising magnesium oxide, magnesium hydroxide, or colloidal magnesium hydroxide.

9. A crosslinked molded product obtained by molding and crosslinking the polymer composition according to claim 3.

10. The crosslinked molded product according to claim 9, wherein the molded product is surface-treated with highly basic aluminum chloride, highly basic aluminum nitrate, an internal sizing agent, a surface sizing agent, or a crosslinking agent comprising:
    a neutralized product of an aluminate complex salt of a hydroxyl group-containing organic compound;
    a divalent metal ion $Ca^{2+}$, $Mg^{2+}$, or $Zn^{++}$ bound product of the aluminate complex salt of a hydroxyl group-containing organic compound; or
    a reaction product with a carboxylic acid of the aluminate complex salt of a hydroxyl group-containing organic compound.

11. The crosslinked molded product according to claim 9, wherein the molded product is a dip molded article or a paper product.

12. The crosslinking agent according to claim 1, the crosslinking agent is a crosslinking agent of a carboxy group and/or a nitrile group.

13. The crosslinking agent according to claim 1, wherein the neutralized product of an aluminate complex salt of a hydroxyl group-containing organic compound is a carbon dioxide reaction product of an aluminate complex salt of a hydroxyl group-containing organic compound.

14. The polymer composition according to claim 3, wherein the neutralized product of an aluminate complex salt of a hydroxyl group-containing organic compound is a carbon dioxide reaction product of an aluminate complex salt of a hydroxyl group-containing organic compound.

15. The crosslinked molded product according to claim 9, wherein the neutralized product of an aluminate complex salt of a hydroxyl group-containing organic compound is a carbon dioxide reaction product of an aluminate complex salt of a hydroxyl group-containing organic compound.

16. The crosslinking agent according to claim 1, wherein the hydroxyl group-containing organic compound is a polymer polyol.

* * * * *